July 22, 1941.  E. R. HELLMAN  2,250,062
PISTON RING
Filed March 20, 1939  2 Sheets-Sheet 1
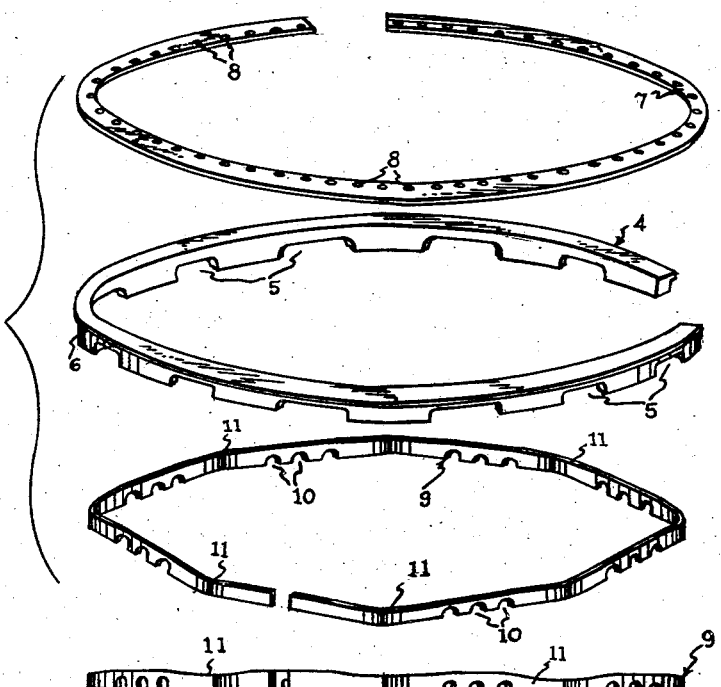
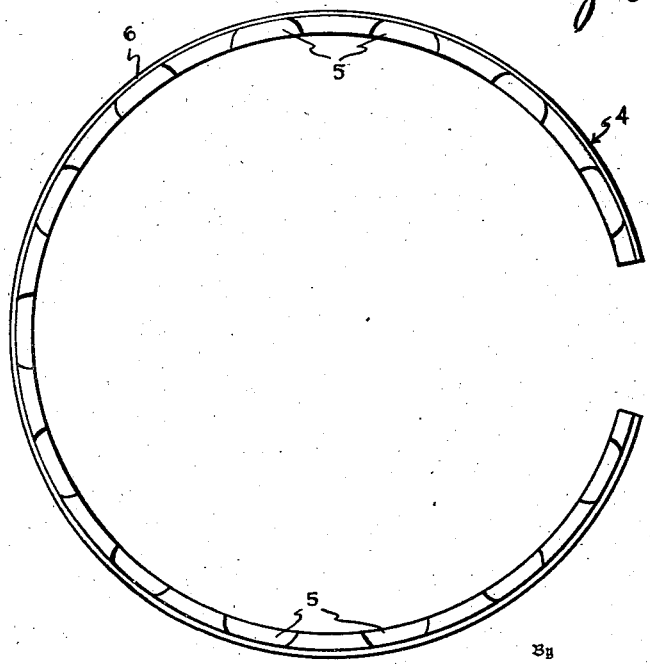
Inventor
Ernest R. Hellman
Attorney July 22, 1941.  E. R. HELLMAN  2,250,062

PISTON RING

Filed March 20, 1939  2 Sheets-Sheet 2

Inventor
Ernest R. Hellman

By

J. S. Murray
Attorney

Patented July 22, 1941

2,250,062

UNITED STATES PATENT OFFICE 2,250,062

PISTON RING

Ernest R. Hellman, Detroit, Mich., assignor to Superior Piston Ring Company, Inc., Detroit, Mich., a corporation of Michigan Application March 20, 1939, Serial No. 262,827

1 Claim. (Cl. 309—45)

This invention relates to composite piston rings and particularly piston rings in which cast iron and steel ring members are combined.

An object of the invention is to dispose cast iron and steel ring members in a side by side relation within a piston groove and to dispose in the bottom portion of said groove an expander spring designed to take effect on the cast iron ring only.

Another object of the invention is to so form said expander spring that it may occupy approximately the full width of the groove and yet take effect only on the cast iron ring member.

A further object is to so fashion said steel ring member as to increase its expansive effort, eliminating necessity for subjecting it to the aforementioned expander spring.

These and various other objects are attained by the construction hereinafter described and illustrated in the accompanying drawings, wherein:

Fig. 1 is perspective view of the members comprising one form of the ring, and of an associated expander spring, said members being shown disassembled.

Fig. 2 is an elevational view of the periphery of the expander spring.

Fig. 3 is a bottom plan view of the cast iron ring member.

Figure 4:
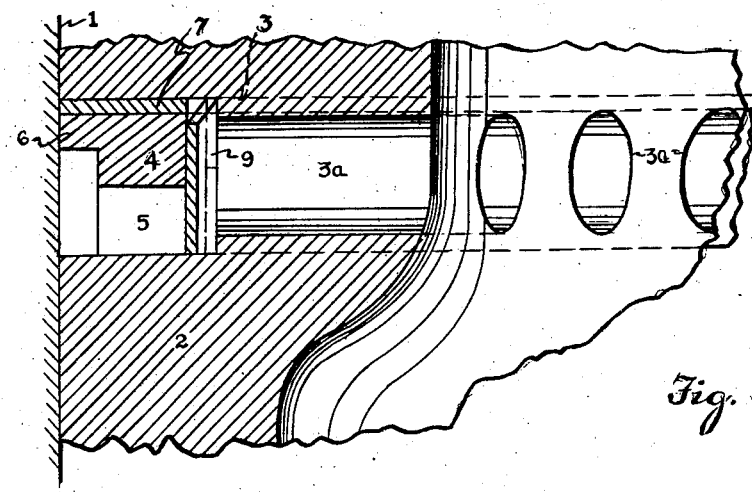
Fig. 4 is a fragmentary radial sectional view of a piston and cylinder, showing the assembled ring installed in the piston.

In these views, the reference characters 1 and 2 designate respectively a cylinder, such as that of an internal combustion engine, and a piston operating in such cylinder. Said piston is formed with the usual grooves (not shown) for receiving sealing rings, and one or more of the latter are particularly designed to resist excessive lubricant flow lengthwise of the piston, being hence commonly termed oil rings. The improvements herein disclosed relate to an oil ring, and the groove receiving same is designated 3. From such groove, a plurality of oil vent passages 3a extend to the interior face of the piston (see Fig. 4).

In the form of the invention shown in Figs. 1, 2, 3 and 4, there is employed a cast iron split ring member 4, having its bottom face formed with a plurality of circumferentially spaced oil passages 5 extending between the outer and inner peripheries of the ring. As best appears in Fig. 3, the opposite walls of each of said passages preferably diverge, as they extend inwardly, thus progressively increasing the capacities of the passages from their outer or inlet ends to their inner or outlet ends. It is preferred also to form the peripheral face of the member 4 with a circumferential rib 6 above said oil passages and bordering the top face of the ring. This has the dual effect of providing a cylinder-contacting face on the member 4 of a width materially less than that of said member, and of forming the outer periphery of said member with a coextensive groove opening both downwardly and outwardly and providing for a ready admission of oil to all of the passages 5.

Superposed on the cast iron member 4 is a relatively thin split steel ring member 7, the members 4 and 7 together fitting in the groove 3 with sufficient freedom that they may readily expand or contract therein, and maintain sealing engagement with the cylinder wall. The radial thickness of the two said members is preferably substantially the same. The steel ring member is formed by rolling a flat wire or ribbon of steel to an annular form and due to such method of its formation, there results a materially greater compression of the steel in the inner portion of the member 7 than in its outer portion. It is preferred to further increase the compressive stress in said inner portion by indenting the member 7 at numerous spaced points 8 in proximity to its inner periphery.

Fitted within the bottom portion of the groove 3, is a ribbon steel split expander spring 9 tending to assume the polygonal form shown in Fig. 1, but distorted to a roughly circular form when compressed between the piston ring and the bottom of said groove. The sides of the polygon formed by the spring 9 are each pierced by a group of oil flow openings 10, assuring a substantially free discharge to the passages 3a of oil flowing through the passages 5. The upper edge of the expander spring is ground or otherwise cut away to form a scallop 11 at each of its apices, whereby the width of the spring at such apices is rendered equal to or slightly less than that of the ring member 4. Since it is through the apex portions that the expander spring transmits its thrust outwardly, it is evident that by thus eliminating such portions in the plane of the steel ring member 7, the latter is relieved of any expander ring thrust.

Figure 5:
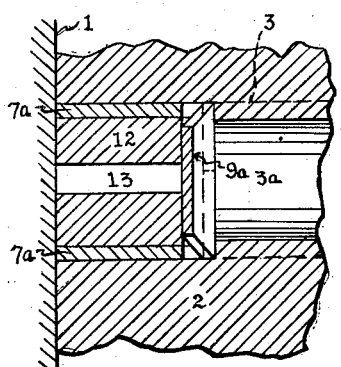
Fig. 5 is a view somewhat similar to Fig. 4, but showing a modified type of piston ring and expander spring.
Figure 6:
Fig. 6 is an edge view of the cast iron ring employed in the assembly shown by Fig. 5.
Figure 7:
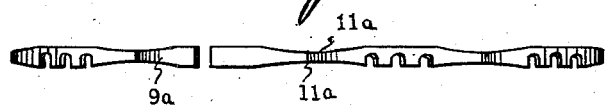
Fig. 7 is an edge view of the expander spring used in said assembly.

In the modification shown in Figs. 5, 6 and 7, a cast iron ring member 12 fits in the piston groove 3a between two steel sealing ring members 7a, each similar to the ring member 7 already described. The cast iron ring member is similar to the member 4 already described, except that its oil passages 13 are formed between the top and bottom faces of said member 12 instead of interrupting one of said faces. The bottom portion of the groove 3a is occupied by an expander spring 9a, similar to the spring 9 already described, except that both edges of the spring are scalloped at the apices of the polygon formed by the spring, as indicated at 11a. Thus it is assured that both steel sealing ring members will be relieved of expander ring thrust, and concentration of such thrust on the cast iron ring is assured.

Figure 8:
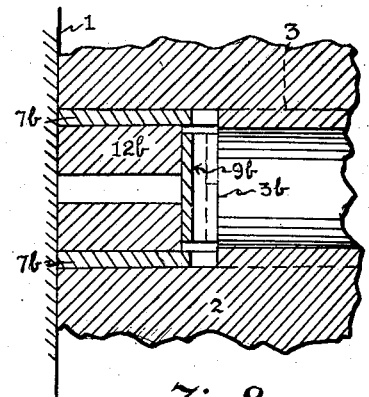
Fig. 8 is a view similar to Fig. 5, but disclosing a further modification.

In the further modification disclosed by Fig. 8, there is again employed a cast iron sealing ring 12b fitted within a piston groove 3b between two relatively thin steel sealing rings 7b. The bottom portion of said groove is occupied by an expander spring 9b, which in this case is of a constant width equal to or slightly less than that of the cast iron ring. The interior diameter of the cast iron member slightly exceeds that of the two steel sealing members, whereby the apices of the expander spring lie between said steel members, thus assuring that the expansive effort of the spring 9b will be concentrated on the cast iron member.

In so providing oil passages in the cast iron ring that the cylinder-engaging face of this ring is materially reduced, wearing of the ring to a perfect fit is expedited.

The described composite ring, in each of its three forms, secures the advantage that the entire expander spring effort is concentrated upon the cast iron member of the ring. This is highly desirable since the cast iron member requires a supplemental expansive effort far more than any steel sealing member occupying the same groove. The supplementary thrust derived from the expander ring is necessarily of small magnitude, since there is room only for a light spring in the space between the piston ring and groove bottom. Apportioning such light thrust between the cast iron and steel members unduly reduces the supplemental effect on the cast iron member.

It has been found that the steel sealing member or members, if properly constructed, are subject to a sufficient inherent expansive stress to eliminate need of any supplemental effort, and this is particularly true if the steel sealing rings, already under relatively high compression in their inner portions, have such compression further increased by indenting such portions as has been described. It has been found, in this connection, that the steel sealing rings do not lose expansive effort through wear but rather tend to increase such effort, since the latter is concentrated in the inner portions of the rings, and wear of their outer portions affords freer play to such effort.

Scalloping an edge or both edges of the expander ring, as has been described, derives an advantage additional to that already mentioned, in that greater flexibility of the expander ring is achieved, and such ring may hence be of a somewhat heavier construction than would otherwise be feasible.

The invention is presented as including all such modifications and changes as come within the scope of the following claim.

What I claim is:

In a composite piston ring, the combination with a cylinder and a piston operating in such cylinder and having an annular groove, of a ring fitted in such groove comprising a split cast iron expansible ring member and a pair of relatively thin split steel expansible ring members disposed at opposite sides of the cast iron member, the inner diameter of the cast iron member exceeding that of the steel members, and a split expander ring compressed between the cast iron member and the bottom of said groove and having portions engaged between the steel members.

ERNEST R. HELLMAN.